United States Patent
Beard et al.

(10) Patent No.: US 9,713,793 B2
(45) Date of Patent: Jul. 25, 2017

(54) SURFACE FREE ENERGY BASED FILLED POLYMER MICROPOROUS FILMS

(75) Inventors: Kirby W. Beard, Norristown, PA (US); Ann M. Edwards, Plymouth Meeting, PA (US)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 635 days.

(21) Appl. No.: 13/419,225

(22) Filed: Mar. 13, 2012

(65) Prior Publication Data

US 2012/0232178 A1    Sep. 13, 2012

Related U.S. Application Data

(60) Provisional application No. 61/452,127, filed on Mar. 13, 2011, provisional application No. 61/452,128, filed on Mar. 13, 2011, provisional application No. 61/550,886, filed on Oct. 24, 2011.

(51) Int. Cl.
| | | |
|---|---|---|
| *C08J 9/00* | (2006.01) | |
| *B01D 69/10* | (2006.01) | |
| *B01D 67/00* | (2006.01) | |
| *B01D 69/02* | (2006.01) | |
| *H01M 2/16* | (2006.01) | |
| *B01D 69/14* | (2006.01) | |
| *B01D 71/02* | (2006.01) | |
| *B01D 71/34* | (2006.01) | |
| *H01M 10/052* | (2010.01) | |

(52) U.S. Cl.
CPC ......... *B01D 69/10* (2013.01); *B01D 67/0083* (2013.01); *B01D 69/02* (2013.01); *B01D 69/141* (2013.01); *B01D 69/148* (2013.01); *H01M 2/1606* (2013.01); *H01M 2/166* (2013.01); *B01D 69/14* (2013.01); *B01D 71/024* (2013.01); *B01D 71/34* (2013.01); *B01D 2323/21* (2013.01); *H01M 10/052* (2013.01)

(58) Field of Classification Search
CPC .... B01D 67/0083; B01D 69/02; B01D 69/10; B01D 69/141; B01D 69/148; B01D 2323/21; B01D 69/14; B01D 71/024; B01D 71/34; H01M 2/1606; H01M 2/166; H01M 10/052
See application file for complete search history.

(56) References Cited

U.S. PATENT DOCUMENTS

| | | | |
|---|---|---|---|
| 6,811,911 B1 * | 11/2004 | Peled | C08J 5/20 424/486 |
| 2003/0201229 A1 * | 10/2003 | Siwak | B01D 61/142 210/650 |
| 2003/0209486 A1 * | 11/2003 | Kools | B01D 67/0009 210/500.21 |
| 2005/0098913 A1 | 5/2005 | Funaoka et al. | |
| 2008/0203012 A1 | 8/2008 | Yeager et al. | |
| 2010/0178567 A1 | 7/2010 | Hauser et al. | |

OTHER PUBLICATIONS

Surface tension values of some common test liquids for surface energy analysis. Nov. 24, 2006—www.surface-tension.de.*
Solid surface energy data (SFE) for common polymers. Nov. 20, 2007—www.surface-tension.de.*
Non-Final Office Action—U.S. Appl. No. 13/419,234 dated Dec. 15, 2016.

* cited by examiner

*Primary Examiner* — Irina S Zemel
(74) *Attorney, Agent, or Firm* — Cantor Colburn LLP

(57) ABSTRACT

A microporous membrane may be manufactured using a polymer binder and a filler material using a liquid pore forming agent having a surface free energy that is lower than that of the filler and higher than that of the polymer. The repulsion of the pore forming agent to the polymer may form the pores of the membrane, while the attraction of the polymer to the filler may encapsulate the filler into the structure of the membrane. The filler may be particles that are on the order of or smaller than the wall thickness of the microporous structure.

16 Claims, 4 Drawing Sheets

SURFACE FREE ENERGY BASED FILLED POLYMER MICROPOROUS FILMS

CROSS REFERENCE TO RELATED APPLICATIONS

This application claims the benefit of and reference to U.S. Provisional Patent Application Ser. No. 61/452,127 entitled "Filled Porous Membrane" filed 13 Mar. 2011 by Kirby W. Beard, U.S. Provisional Patent Application Ser. No. 61/452,128 entitled "Filled Microporous Polymer Formulations Using Thermodynamic Equilibrium to Create Optimized Microporous Membranes" filed 13 Mar. 2011 by Kirby W. Beard, and U.S. Provisional Patent Application Ser. No. 61/550,886 entitled "High Performance Separators" filed 24 Oct. 2011 by Kirby W. Beard, the entire contents of which are hereby expressly incorporated by reference for all they disclose and teach.

BACKGROUND

Porous membranes are used for many applications, including filters, air permeable membranes, and in electrochemical devices such as batteries and capacitors. Depending on the application, an effective porous membrane may be easy to manufacture, have consistent pore size and good tortuosity, and have acceptable mechanical properties for processing and use.

SUMMARY

A microporous membrane may be manufactured using a polymer binder and a filler material using a liquid pore forming agent having a surface free energy that is lower than that of the filler and higher than that of the polymer. The repulsion of the pore forming agent to the polymer may form the pores of the membrane, while the attraction of the polymer to the filler may encapsulate the filler into the structure of the membrane. The filler may be particles that are on the order of or smaller than the wall thickness of the microporous structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
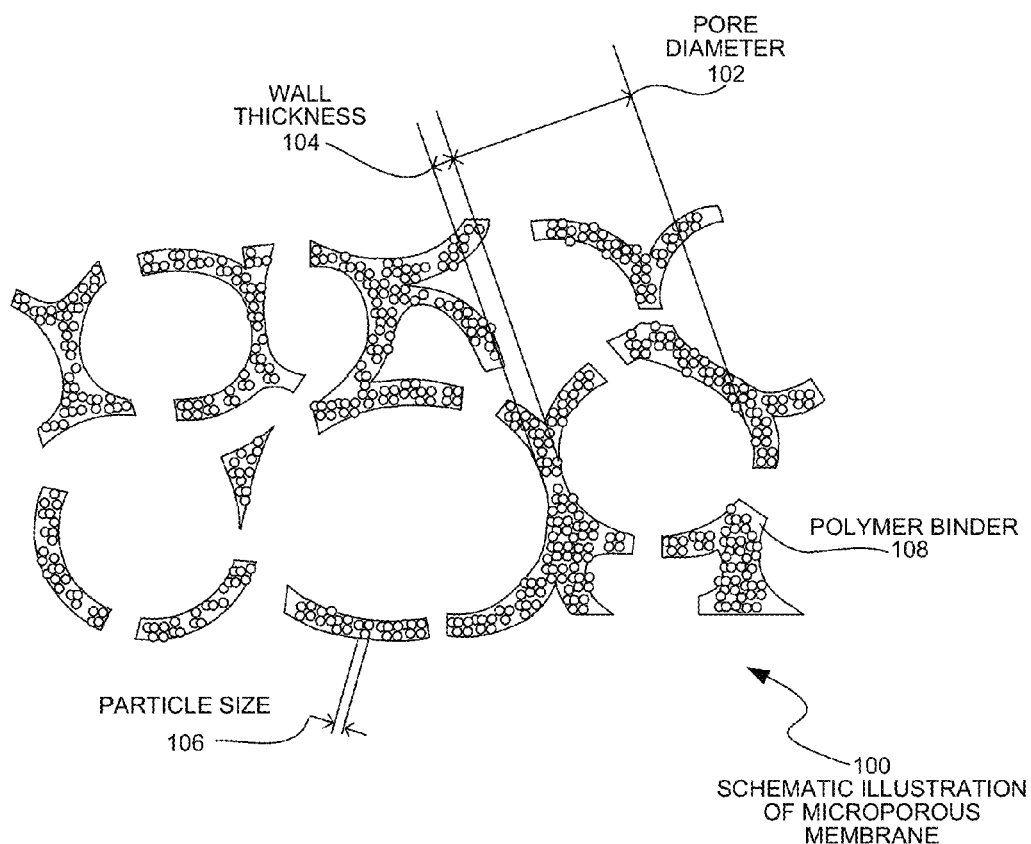
FIG. 1 is a schematic diagram illustration of an embodiment showing a cross-section of filled porous material.

A microporous membrane may be manufactured using a liquid pore forming agent that has a surface free energy that is less than that of a particle filler and greater than that of a polymer binder. The manufacturing process may suspend the filler material and the polymer in the pore forming agent, then solidify the polymer and filler material with the pore forming agent present. After the polymer begins to gel, the pore forming agent may be removed.

The polymer may be melted, dissolved, or otherwise placed in a formable state during the manufacturing process. In one embodiment, the polymer may be heated and mixed with the pore forming agent, then cooled to form the microporous structure. Such embodiments may introduce the filler material to the polymer prior to heating, while other embodiments may introduce the filler material along with the pore forming agent.

In other embodiments, the polymer may be dissolved in a liquid solvent prior to the forming process. Such embodiments may dissolve the polymer into a solvent, add the pore forming agent and filler material, then remove the solvent to begin the forming process. The pore forming agent may be removed after solidification begins.

In some embodiments, the surface free energy of the liquid in the forming process may change during the formation. For example, the liquid may be heated or cooled during the forming process, and the surface free energy of the liquid may change during the heating or cooling process. In another example, a liquid having two different components may change surface free energy as one of the components is driven off during the formation process. In an example using acetone and water to form a PVDF membrane, the liquid consisting of acetone and water may change surface free energy when the acetone is evaporated off, leaving the water. In such an example, the surface free energy prior to formation may be a combination of the acetone and water, while the surface free energy after the formation process may be that of water alone.

The thermodynamic equllibira may affect how liquids, solids, solutions, or molten mixes of multi-component polymer systems are able to gel and solidified during formation of the porous structure. Specifically, each specific type of material may have its own physical properties that dictate how the molecules are bound together and how each material interacts with its neighbors during the manufacturing process. In the case of fluids, whether solvents, non-solvents, molten polymers, aqueous media, etc., simple calculations of interfacial surface tensions may indicate their properties. However, when liquids and solids contact each other the interactions may become more complex. In producing highly porous membranes, a factor may be the physical interaction of the liquid and the surfaces of the solids.

Specifically, the determination of surface free energy (SFE) between liquids and solids may help predict and enable the control of the formation of porous, filled composite films of polymers or any other similar solid binder matrix. The SFE existing between liquid and solid components may indicate whether the cohesive forces of a liquid's molecules are greater than the attractive forces between the liquid and solid surfaces. These latter forces may be distinct from the attractive forces within a bulk material. An overall decrease in the surface energy may drive the wetting of a solid surface by a liquid. If the attraction between a solid and a liquid are stronger than the bonding forces of the liquid itself, the liquid may spread and wet the solid. If the thermodynamic forces of liquid spreading on the solid exceed the forces for liquid cohesion, the system will tend towards an equilibrium point where the solid is wetted.

Another way of expressing these thermodynamic relationships may be by determination of contact angle at the boundary of two components. A liquid droplet deposited on a solid surface may have an interface on the borders of the liquid contacting the solid that is less than 90 degrees (from within the liquid phase) when the SFE favors spread of the liquid on the solid. A contact angle greater than 90 degrees indicates poor wetting of the solid surfaces. However, the contact angle may also be dependent on many additional variables. Absorbed water molecules, oxidation, surface roughness, particle size, etc. can dramatically affect the spread or wetting of liquids on solids due exclusively to the thermodynamic equilibria of the materials.

In order to form a highly porous material, extremely small particles may be blended into a polymer melt or solvent solution with both a polymer and a liquid. During formation, the creation of pores and the bonding of the solids to the polymer can be carefully controlled for good results.

Microporous polymer membranes suitable for battery separators, filters and other porous media applications, especially those incorporating high levels of desirable filler additives, may have the following properties: high levels of porosity, uniform pore distribution, well defined and controlled pore geometry, and high film strength, including good bond between filler particles and polymers.

In general, any liquid in which a polymer is dissolved, dispersed or otherwise deployed may be used to create a microporous structure upon cooling and/or drying if the polymer precipitates or gels into a diffuse physical network. Two factors may control the pore formation:

1. The amount of pore forming liquid (i.e., a liquid with low solvating power toward the polymer phase and/or low miscibility with any high strength solvents that are present) within the polymer solution or melt.

2. The degree of the thermodynamic energy required for the liquid to wet the polymer gel or solid phase material.

When high levels of a liquid with a high level of thermodynamically unfavorable wetting towards the polymer is used in the formation process, the liquid may provide higher levels of porosity in the membrane as a result of the liquid/solid interactions. However, liquid/polymer systems with high levels of interfacial resistance may not only provide higher total void content but may also provide larger pore geometries as the thermodynamic properties of such polymer solutions resist shrinkage more effectively upon liquid removal.

The situation may become more complex when both polymers and solid particles are used in the membrane and a liquid solvent or pore former is also used. While liquids are not the only mechanism for creating pores, liquids provide an effective method to form high levels of void content.

In the following table, the effects of using combinations of three components (liquid, polymer and fillers) with specific property relationships to produce membranes are shown.

Case 1 from the table is a combination which does not produce adequate porosity. The results for case 1 may be interpreted as follows:

1. A low volume level (if any voids are created at all) of small pore diameters would be expected from such a system where all components wet each other out. This formulation would be quenched in a liquid extraction bath to develop even a modest level of porosity, or else would include soluble materials that could later be leached out to form pores.

2. However, due to the excellent contact of the three components during a extrusion/casting and liquid removal process, a high degree of bonding of filler particles and polymers with little gaps or weak adhesion areas are expected. Such a film may then be expected to have high tensile strength and good overall mechanical film integrity.

The membrane characteristics for this Case 1 example are therefore rated as having a "−" level of porosity (i.e., virtually no voids and very little through pores), but it would likely have very good mechanical robustness (+). Overall, though, the film would not be an optimal membrane design for various applications of microporous membranes, such as batteries and other electrochemical devices.

The hydrophobicity and hydrophillicity of a material indicates whether or not water wets the material. Anatase, a form of TiO2, is described as hydrophobic while kaolinite, a type of clay, is noted as being hydrophilic. Hence, if one or the other of these fillers is used in a polymer solution based on a water soluble polymer, the film properties will likely be vastly different.

Case 2 uses a solvent/liquid that does not fully wet out the polymer, but at least may dissolve the polymer to some degree. An example may be DMSO and acetone. The solvent/liquid may fully wet out the filler and the polymer may wet the fillers. During membrane formation, the polymer may bond to the fillers. The thermodynamic properties of this system (i.e., contact angle) may be as follows:

Polymer Binder/Liquid: <90 deg.
Solid Filler/Liquid: >90 deg.
Polymer Binder/Solid Filler: >90 deg.

This system provides reasonable levels of porosity with good pore size control and strong films.

Case 3 uses the solvent to wet out and, in some cases, dissolve to some degree the polymer. The solvent may not wet out the filler, yet the polymer may be able to wet out onto the filler powders. While porosity may be somewhat low, these membranes may be able to incorporate higher levels of filler content and generally have improved strength.

Case 4 is a system where the liquid does not wet out either the filler or the polymer. On formation of the membrane, the polymer and fillers may readily bond and, given the favorable thermodynamic conditions, may create high porosity

| ID No | Liquid Wetting Action Towards: Fillers | Polymers | Polymer/ Filler Wetting: | Void % (est.) | Component/Membrane Relations* Pore Structure Size | Rating | Film Integrity Tensile | Rating | Net Overall Result |
|---|---|---|---|---|---|---|---|---|---|
| 1 | Wets | Wets | Wets | Low | Small | − | + | 0 | Poor |
| 2 | Wets | Repels | Wets | High | Big | 0 | Med. | 0 | Good |
| 3 | Repels | Wets | Wets | Low | Small | − | Med. | 0 | Fair |
| 4 | Repels | Repels | Wets | High | Med. | + | Med. | 0 | Good |
| 5 | Wets | Wets | Repels | Low | Small | − | Med. | 0 | Fair |

In the table, the "rating" refers to the potential benefit, where "+" indicates a better than average result and "−" indicates a less than average result. The term "Med" indicates neutral or medium properties.

levels. An example of this concept may use a molten polymer but with a high surface tension liquid that is well dispersed so as to create an optimal pore pathway. While water may have a sufficient surface tension in some cases, mercury may be an extreme example of a high surface tension liquid.

Case 5 is a system where the liquid wets and spreads onto both polymer and filler surfaces. The thermodynamic analysis of case 5 renders it is less likely to create high porosity levels. Nonetheless, when the repulsive forces between filler and polymer are heightened or maximized, and when high filler loadings are used with a low amount of polymer, the result is a porous network with some integrity.

The two combinations that will provide the most optimized pore structure along with high levels of filler loadings are Cases 2 and 4. As detailed in the table above, these combinations of three component systems both use a solvent/polymer system that has repulsive characteristic of the liquid and the polymer. This feature allows for creation of high levels of porosity. In both cases the filler and the polymer under favorable thermodynamics coat/wet/bond and hence create the strongest possible filled polymer system. Additional components can be included (co-solvents, co-polymers, additional fillers, etc.) in the formulation, but the same principles apply to matching all the components or the combinations of similar types of components to achieve an optimal result.

Good results may be achieved when the solid particles are contained exclusively or largely within the pore walls and when an open, continuous pore structure is provided throughout the film. When filler additives are allowed to block the pore pathways or when the total porosity and pore structures are negatively impacted either by the direct filler addition or by indirect interference in pore creation, an inferior membrane may result.

A microporous membrane may have a high porosity and small pore size. Within the pore walls, a highly packed spherical filler material may be bound with a polymer. The membrane may be formed with a non-woven or other reinforcement material.

The membrane may have a porosity of greater than 50% and an average pore size of less than 1 micron. The pore wall thickness may be on the order of 0.02 microns, and the filler particle size may be on the order of 0.001 microns or less. The filler material may be greater than 10% of the volume of the membrane.

Very small particles often have a difficulty packing in tight densities. Very small particles are often difficult to pack tightly, due to electrostatic effects or other phenomena. When fillers are very tightly packed into the pore walls of a microporous membrane, the dimensional ratio of filler material particle diameter to polymer pore wall thickness may be on the order of 1:5.

The filler materials may be any solid material, such as ceramic, glass, oxide, carbon, composite, plastic, polymer composite, metal, cellulose in any shape or morphology. In many embodiments, the particles may be spherical or nearly spherical in shape.

The membrane may be manufactured from several different methods, including liquid extraction, phase inversion, leaching, stretching, mechanical mechanisms, or other method. The membrane may use various polymers, such as polyethylene, polypropylene, PET, PVDF, acrylic, PVC, amide, or other polymers.

FIG. 1 is a schematic diagram of an embodiment 100 showing a cross section of porous material that may have filler material. Embodiment 100 is not to scale, but is used to define the various dimensions of a porous membrane.

Embodiment 100 illustrates a small cross section of a membrane. In many embodiments, a porous membrane may include a reinforcement material, such as a woven or non-woven web made of various materials. The reinforcement material may add structural strength for manufacturing or the end use of the membrane.

The membrane of embodiment 100 may be formed using any type of manufacturing process for porous materials. Such processes include liquid extraction, conventional or nonconventional phase inversion, leaching, stretching, mechanical mechanisms, or other manufacturing processes.

The pore diameter 102 may vary from 0.01 to 10 microns, with a typical size of 0.1 to 1 micron. In some embodiments, the pore diameter 102 may be as large as 5 mm.

The wall thickness 104 may vary from 0.01 to 0.05 microns, but may vary from 0.001 to 0.1 micron in some areas, depending on the pore size.

The particle size 106 may vary from 0.005 to 0.1 microns, but may vary from 0.001 to 0.2 microns in some embodiments. In some embodiments, the particle size may be measured as a maximum size, which may be appropriate when the particles are screened. Some embodiments may measure particle size by an average or median particle size.

Many embodiments may use spherical or particles that are generally round, ellipsoid, square, or other shape. Such embodiments may use a single dimension to measure the particles. An example of such an embodiment may be TiO2.

In some embodiments, fibrous particles may be used. Fibrous particles may be elongated in the shape of rods, cones, platelets, or some other shape. An example of such an embodiment may be Wollastinate. In still other embodiments, fibers of any shape may be used.

Smaller fibrous particles may be captured inside the polymer binder 108, whereas in second optional embodiment larger fibrous particles, greater than 1 micron may extend through, across or between the pores creating a porous fibrous network independent of the fillers deployed within the polymer membrane walls that surround the larger fibrous particles.

The particles in the example of embodiment 100 may be captured inside the polymer binder 108, as opposed to having the particles loosely positioned within the pores.

The ratio of pore diameter to particle size may be in the range of 2:1 to 10:1, with many embodiments being greater than 5:1.

The ratio of wall thickness to particle size may be in the range of 1:1 to 5:1, with many embodiments being greater than 2:1. Some embodiments may be in the range of 10:1, 20:1, or greater.

The volume of filler to the total volume of the membrane may be greater than 10% or in some cases greater than 20%. Overall, an example membrane may have 70% voids, 20% solid particles, and 10% polymer binder. In some embodiments, the volume of particles to polymer may be 1:1, 1:2, 2:1, 1:1.5, 1.5:1, or some other ratio.

The membrane may be manufactured so that the fillers are dispersed within the wall structures while keeping the pore structures. The porosity of the membrane may be greater than 50% for applications such as battery separators or filters, and the pore size may be less than 1 micron in many embodiments.

The pore diameter to pore wall thickness ratio may be greater than 1:1, and may be less than 10:1 in many embodiments. The particle diameter to pore wall thickness ratio may be greater than 1:1 and may be greater than 1000:1 in some cases.

For a macropore membrane, a pore size may be 0.1 to 1 micron. A micropore membrane may have a pore size of 0.01 to 0.1 micron. An ultrapore membrane may have a pore size of 0.001 to 0.01 micron. A nanopore membrane may have a pore size of 0.0001 to 0.0001 micron, and a reverse osmosis membrane may have a pore size of less than 0.0001 microns. Any of the above sized membranes may be manufactured with fillers.

One use of a filled porous membrane may be as a high temperature failure mechanism. In an example of an electrochemical cell, such as a battery, a highly filled membrane may be used as a separator between an anode and cathode. If the battery is operated at a very high temperature, the polymer binder of the membrane may melt and cause the porous structure to collapse. The filler material, presumably manufactured from a higher temperature material, may serve to limit the flow of ions between the electrodes when the porous structure collapses, and may also prevent the electrodes from touching, which may result in the catastrophic release of energy.

Figure 2:
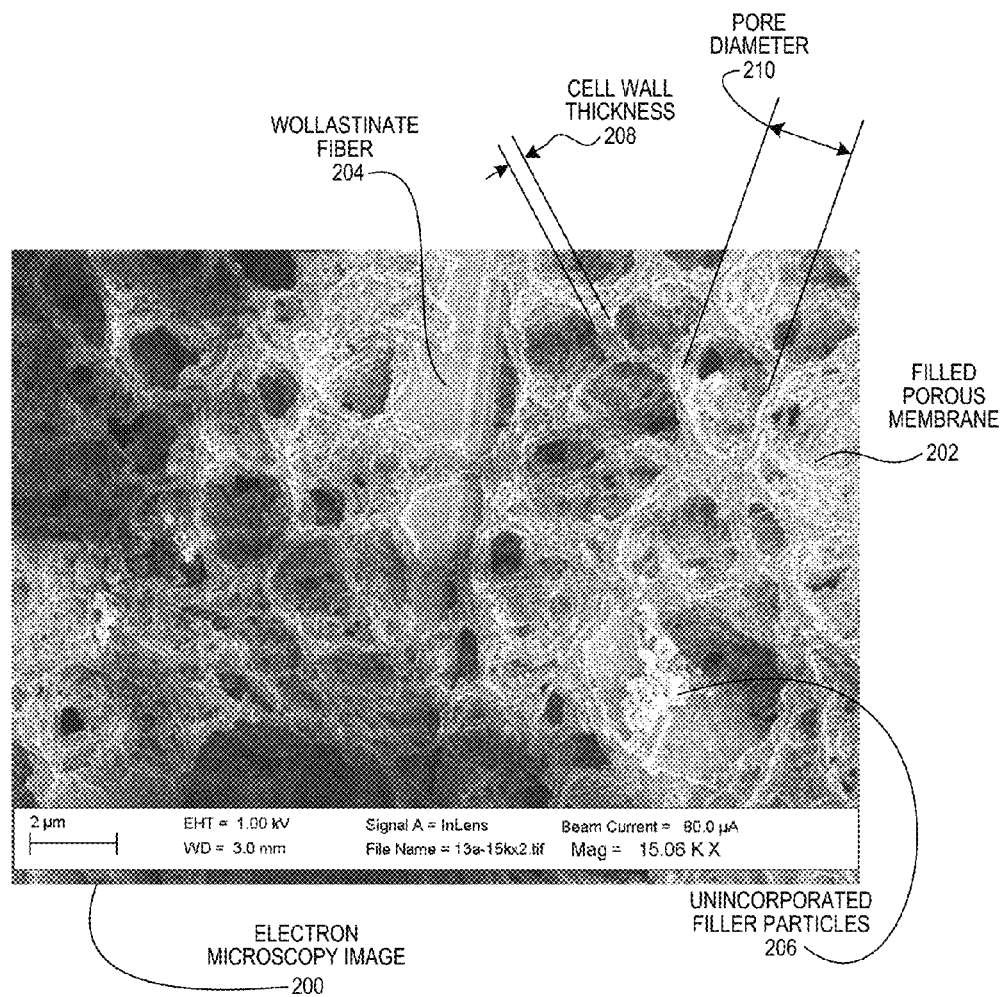
FIG. 2 is an electron microscopy image showing a surface of a filled porous material.

FIG. 2 is an electron microscopy image 200 showing an embodiment of a filled porous membrane 202.

The membrane 202 is a porous membrane manufactured using a two-liquid casting process. A PVDF polymer was dissolved in acetone and cast using water as a pore forming agent. The casting was performed over a non-woven web, which is incorporated in the thickness of the membrane.

The membrane 202 is filled with TiO2 particles. The TiO2 particles make up approximately 70% by weight of the membrane. A portion of the TiO2 particles are visible as unincorporated filler particles 206. The polymer matrix has incorporated most of the TiO2 particles.

The TiO2 particles are on the order of or smaller than the cell wall thickness 208.

The membrane 202 also incorporates Wollastonite fibers as a second filler material. The Wollastonite fibers constitute less than 50% by weight of the filler material. The Wollastonite fibers have a diameter that is substantially larger than the pore diameter 210.

Post Processing

Some membranes may benefit from a post processing step where the polymer may be softened or re-melted. The post processing may be performed by heating the membrane at or above the melting point of the polymer, or by applying a liquid solvent to the membrane.

The post processing step may be applied to membranes that have a high degree of filler material that has a higher melting point than the polymer. During the post processing steps, the polymer tends to further bind to the filler material, making the membrane stronger than before treatment. Also, the pores in the porous material tend to open somewhat, as the walls of the pores consolidate during post processing.

Remarkably, the post processed membranes do not exhibit a large degree of shrinkage. Even though the polymer is at or above its melting point or partially dissolved, the microporous structure does not collapse. While there may be a filled polymer formulation or a post processing temperature where the microporous structure does collapse, an effective formulation and post processing cycle will not reach that point.

The post processing step may be applied to microporous membranes that have a filler material concentration of 50% by volume or higher. Such filler concentrations may form microporous structure where the polymer binder may trap or contain the filler material. During the initial formation of the microporous structure, the pore walls may contain filler that is bound to the polymer. During post processing, the polymer may further consolidate and bind to the filler, yielding a strong yet still microporous membrane.

In some cases, the porosity of the membranes may increase after post processing, while in other cases, the porosity of the membranes may decrease after post processing. The physical changes of the membranes after post processing may be influenced by the wetting and repelling forces between the polymer and the filler materials. In cases where the polymers readily wet the filler, the porosity may increase during post processing as the polymer may be attracted or absorbed into the filler particles. In cases where the polymers are less attractive to the filler, the porosity may stay the same or decrease after post processing.

Additional mechanical processing may increase or decrease the porosity of the membrane. Such mechanical processing may include calendering or centrifuging that may decrease porosity. Other mechanical processing, such as stretching, may increase porosity.

In some embodiments, the mechanical processing may be performed simultaneously with the post processing described above. For example, a heat calendering process may apply heat above the melt point of the polymer at the same time as mechanically compressing the membrane through two heated rollers. In another example, a solvent bath may be applied during stretching or centrifuging.

Figure 3:
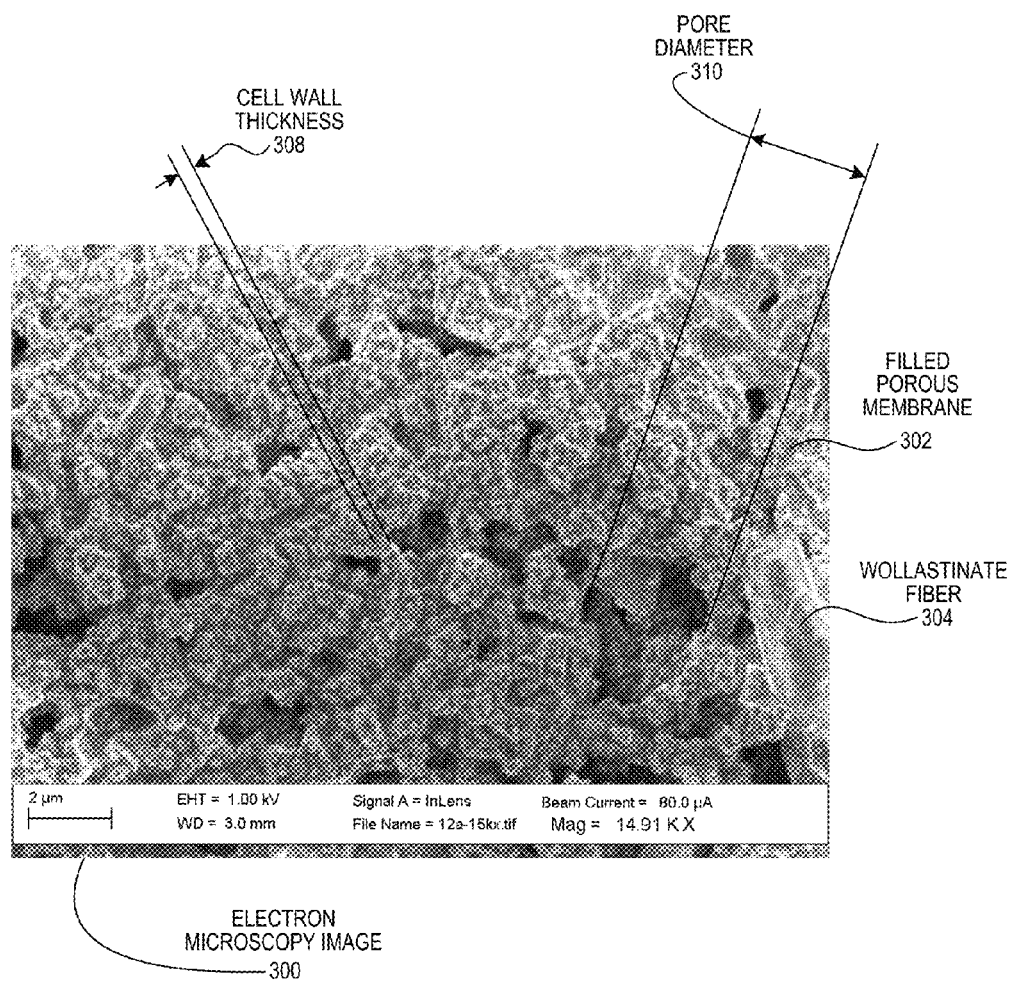
FIG. 3 is an electron microscopy image showing a surface of a filled porous material after post processing.

FIG. 3 illustrates an electron microscopy image 300 of a filled porous membrane 302 that has undergone post processing. The filled porous membrane 302 was manufactured using the same formulation and process as the filled porous membrane 202, however, a post process treatment has been applied. Image 300 is shown on the same magnification scale as that of image 200.

The post process treatment was to heat the PVDF membrane to 180 C for three hours, which is approximately 5 degrees Celcius above the PVDF melt point.

The structural differences between the image 300 and 200 show that the porosity remains in the membrane, but the polymer has congealed around the TiO2 filler. The sample is shown with a Wollastonite fiber 304, and has a cell wall thickness 308 and pore diameter 310 that are similar to that of image 200.

The filled porous membrane 302 shows the small bumps and protrusions of the filler material fully encapsulated by the polymer. The polymer has fully wet the TiO2 filler, yet the microporous structure remains.

Figure 4:
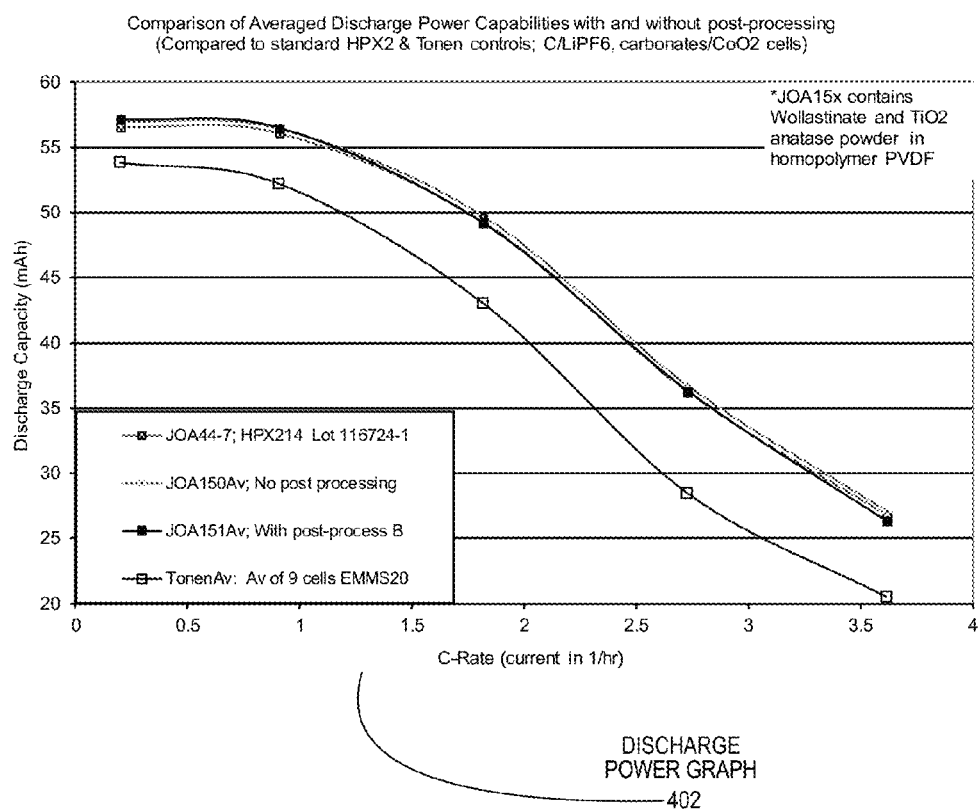
FIG. 4 is a chart showing discharge power for several lithium ion batteries constructed with different microporous membranes.

FIG. 4 illustrates a discharge power graph 402 that shows that batteries constructed with a post treated microporous membrane exhibit very good electromechanical performance. The discharge power graph 402 shows the discharge capabilities of lithium ion batteries constructed with different separator materials. The batteries were of identical construction with the differences being only the separator materials, which are made from different microporous membranes.

The line showing the open square box and labeled "TonenAV" is a control sample of a non-filled microporous membrane. The lines labeled "JOA15x" represent identically prepared membranes with the exception that JOA151Av has undergone a heat treat post processing. The electron microscopy images of FIGS. 2 and 3 are from the same manufacturing batch.

The discharge power graph shows three lines with nearly identical results, specifically, the lines labeled "JOA". This result shows that the post processing step may not adversely affect the performance of the microporous membrane.

Examples

Several example materials have been manufactured using PVDF polymer binder with TiO2 fillers using a two-liquid casting process. The samples listed below have voids percentages from 69-81% and contain 70% fillers as a percent of total solids by weight. All of the samples were cast onto a non-woven web.

| Film Type | Film ID | NW Web Type | Filler as % total solids | Gauge, μm | Dry Bulk Den., g/cc | "As is" Wt., g/m2 | Adj, g/m2/mil | PVdF only, g/m2 | Void Avg., % | Avg. load, g | Adjusted, g/mil | Avg., s/100 cc air | Adj. s/100 cc/mil | Load MD, N/mm2 | Mod. MD, N/mm2 |
|---|---|---|---|---|---|---|---|---|---|---|---|---|---|---|---|
| | | Separator Information | | | | Dry Basis Wt. | | | | Puncture | | Air Permeation | | Tensile | |
| HPX-3, sheets, Hi-Temp Resistant | EBb2 8-1a | NW#1 30 μm, 110° C. lam'd | 70.0 | 37.5 | 0.43 | 16.1 | 10.9 | 2.2 | 73.4 | 141.8 | 96 | 5.7 | 3.9 | 12.3 | 304.5 |
| HPX-3, sheets, Hi-Temp Resistant | EBb2 8-1b | NW#1 30 μm, 110° C. lam'd | 70.0 | 38.6 | 0.53 | 20.6 | 13.5 | 3.5 | 69.7 | | | 9.3 | 6.1 | | |
| HPX-3, sheets, Hi-Temp Resistant | EBb2 8-2 | Base NW, 110° C. lam'd | 70.0 | 25.5 | 0.68 | 17.3 | 17.2 | 3.5 | 67.9 | 58 | 58 | 7.9 | 7.9 | 7.5 | 363.6 |
| HPX-3, sheets, Hi-Temp Resistant | EBb2 8-3 | Base NW, 140° C. lam'd | 70.0 | 22.6 | 0.52 | 11.6 | 13.1 | 1.8 | 75.1 | 50.9 | 57 | 4.1 | 4.6 | 11.5 | 511.5 |
| HPX-3, sheets, Hi-Temp Resistant | EBb2 8-4 | Base NW, 160° C. lam'd | 70.0 | 21.6 | 0.54 | 11.7 | 13.7 | 1.9 | 77.0 | 49.8 | 59 | 4.3 | 5.0 | 8.4 | 419.0 |
| HPX-3, sheets, Hi-Temp Resistant | EBb2 8-5 | Base NW, 180° C. lam'd | 70.0 | 20.2 | 0.46 | 9.4 | 11.7 | 1.2 | 80.8 | 59.2 | 74 | Negl. <1.5 s | | 11.7 | 555.1 |

In some manufacturing processes, a secondary heat treatment of the manufactured film may improve mechanical properties of highly filled porous films. One potential mechanism for this phenomenon may be that the polymer may have an affinity for the filler material and may improve the connections and bonds when brought to near the melt point as a secondary operation.

Examples

In the following table, several samples coupons of 5×5 cm were heated to 180 degrees Celsius for 3 hours. On viewing under the microscope, the PVDF polymer of the samples appeared to have melted, as would be expected at this temperature, but re-solidified on cooling without apparent loss of porosity.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:
1. A method for producing a microporous membrane, the microporous membrane comprising a plurality of pores and walls, the walls defining the pores, said method comprising:
    mixing a polymer with a pore forming agent and a filler material to form a pre-formed mixture; and

| Separator Type | Filler by total solid weight | % Area Shrinkage | Initial Thickness (μm) | Final Thickness (μm) | Initial Air Perm. (s/100 cc air) | Final Air Perm. (s/100 cc air) |
|---|---|---|---|---|---|---|
| Standard HPX3 (supported on NW#1, no filler) | | <5 | 40.6 | 48.3 | 25 | 8 |
| Filled HPX3 on NW#1 (EBb21-9) | 70%, TiO2 anatase reg | <1 | 73.7 | 88.9 | 24 | 13 |
| Filled HPX3 on NW#1 (EBb21-7) | 72%, LTO | <1 | 73.7 | 96.5 | 43 | 30 |
| Filled HPX3 on NW#1 (EBb21-8) | 75% Boehmite | <1 | 157.5 | 119.4 | 20 | 42 |
| Filled HPX3 on NW#1 (EBb21-5) | 76% Wollastinate 8 | <1 | 58.4 | 81.3 | 54 | 21 |
| Filled HPX3 on NW#1 (EBb21-6) | 76% Wollastinaite 4W | <1 | 99.1 | 152.4 | 157 | 16 | solidifying said polymer in the presence of said pore forming agent and said filler material to form said microporous membrane where said filler material is incorporated into said microporous membrane and bound with said polymer;

wherein said microporous membrane comprising at least 2 parts of said filler material to 3 parts of said polymer by volume; said microporous membrane comprising pores having a diameter of 0.1 to 1 micron;

said polymer having a surface free energy lower than said pore forming agent;

said polymer wetting said filler material; and the ratio of said wall thickness to particle size of said filler material being in a range of 1:1 to 20:1.

2. The method of claim 1, said pore forming agent having a surface free energy lower than said filler material.

3. The method of claim 1, said pore forming agent having a surface free energy higher than said filler.

4. The method of claim 1, said filler material having an average particle size less than an average wall thickness of said microporous membrane.

5. The method of claim 4, said filler material having an average particle size less than 0.1 times said average wall thickness.

6. The method of claim 1, said polymer being dissolved in a solvent in said pre-formed mixture.

7. The method of claim 6, said solvent having a lower boiling point than said pore forming agent.

8. The method of claim 7, said solvent being removed during said solidifying.

9. The method of claim 8, said solvent being removed by evaporation.

10. The method of claim 1, said polymer being melted in said pre-formed state.

11. The method of claim 10, said pore forming agent being an oil.

12. The method of claim 11, said solidifying being performed by cooling said mixture.

13. The method of claim 12, said pore forming agent being removed by rinsing after said solidifying.

14. The method of claim 1, said polymer comprising PVDF.

15. The method of claim 1, said polymer being one of a group composed of:
polyethylene, polypropylene, PET, acrylic, PVC, and amide.

16. The method of claim 1, said polymer being one of a group composed of: polyethylene, polypropylene, PET, acrylic, PVC, PVDF, and amide.

* * * * *